United States Patent [19]
Perlman et al.

[11] Patent Number: 5,243,592
[45] Date of Patent: Sep. 7, 1993

[54] METHOD AND APPARATUS FOR DISTANCE VECTOR ROUTING ON DATAGRAM POINT-TO-POINT LINKS

[75] Inventors: Radia J. Perlman, Acton; George A. Harvey, Maynard, both of Mass.

[73] Assignee: Digital Equipment Corporation, Maynard, Mass.

[21] Appl. No.: 597,144

[22] Filed: Oct. 15, 1990

[51] Int. Cl.$^5$ ............................................. H04J 3/26
[52] U.S. Cl. ........................................ 370/17; 370/54; 370/94.3
[58] Field of Search ............... 370/13, 13.1, 16, 17, 370/54, 60, 94.1, 94.3; 379/221; 340/826, 827; 371/20.6, 33

[56] References Cited
U.S. PATENT DOCUMENTS

| | | | |
|---|---|---|---|
| 3,381,272 | 4/1968 | Pasini . | |
| 4,439,859 | 3/1984 | Donnan | 371/32 |
| 4,445,214 | 4/1984 | Reynolds | 370/94 |
| 4,617,657 | 10/1986 | Drynan et al. | 370/60 |
| 4,736,363 | 4/1988 | Aubin et al. | 370/60 |
| 4,751,700 | 6/1988 | Ulug | 370/85 |
| 4,825,206 | 4/1989 | Brice et al. | 340/825.02 |
| 4,866,707 | 9/1989 | Marshall | 370/94.1 |
| 4,905,233 | 2/1990 | Cain et al. | 370/17 |
| 5,038,340 | 8/1991 | Ochiai | 370/17 |
| 5,042,027 | 8/1991 | Takase et al. | 370/54 |
| 5,086,428 | 2/1992 | Perlman et al. | 370/60 |
| 5,128,926 | 7/1992 | Perlman et al. | 370/54 |

Primary Examiner—Douglas W. Olms
Assistant Examiner—Melvin Marcelo
Attorney, Agent, or Firm—Denis G. Maloney; Barry Young; Albert Cefalo

[57] ABSTRACT

A technique for distributing updated distance vectors used in routers, which are connected by point-to-point links having datagram service. Distance vectors are used by routers to route messages over the most desirable paths, but must be continually modified as a result of update messages passed between routers, to reflect changes in network topology. Datagram service does not normally ensure that such update messages will reach other routers, but the technique of the invention uses unique sequence numbers on all information packets containing distance vector update messages, and achieves efficient and timely distribution of updated distance vector information with only a modest storage requirements. Unlike reliable service, which requires each message to be delivered exactly once and in the order sent, the invention allows subsequent update messages to be delivered to the same neighboring router even if previous messages have not yet been received and processed. The invention also provides for retransmission of unacknowledged distance vector information, but without the burden of having to store all transmitted packets until they are acknowledged.

14 Claims, 7 Drawing Sheets

| DEST. | DISTANCE | NEIGHBOR REACHED THROUGH | NEIGHBOR | | | | | | |
|---|---|---|---|---|---|---|---|---|---|
| | | | 1 | 2 | 3 | | n | | N |
| 1 | 10 | 2 | | | | | | | |
| 2 | 12 | 3 | | | | | | | |
| 3 | 8 | 3 | | | | | | | |
| ⋮ | ⋮ | ⋮ | | | | | | | |
| d | 15 | 1 | | | | | | | |
| ⋮ | ⋮ | ⋮ | | | | | | | |
| D | 20 | 4 | | | | | | | |

DISTANCE VECTOR     | SF(d,n) | SN(d,n) |

LEGEND:

⟷ LOCAL AREA NETWORK (LAN)

○ NON-ROUTING DESTINATION

□ ROUTING DESTINATION

—P— DATAGRAM POINT-TO-POINT LINK

| DEST. | DISTANCE | NEIGHBOR REACHED THROUGH | NEIGHBOR | | | | | | |
|---|---|---|---|---|---|---|---|---|---|
| | | | 1 | 2 | 3 | | n | | N |
| 1 | 10 | 2 | | | | | | | |
| 2 | 12 | 3 | | | | | | | |
| 3 | 8 | 3 | | | | | | | |
| ⋮ | ⋮ | ⋮ | | | | | | | |
| d | 15 | 1 | | | | | | | |
| ⋮ | ⋮ | ⋮ | | | | | | | |
| D | 20 | 4 | | | | | | | |

DISTANCE VECTOR

| SF(d,n) | SN(d,n) |
|---|---|

FIG. 2a

| SEQ. NO. | SOURCE (IN HEADER) |
|---|---|
| DESTIN. | DISTANCE |
| " | " |
| " | " |

DISTANCE VECTOR UPDATE

FIG. 2b

| ACK. CODE | SEQ. NO. | SOURCE OF ACK. (IN MESS. HEADER) |
|---|---|---|

UPDATE ACKNOWLEDGEMENT

FIG. 2c

METHOD AND APPARATUS FOR DISTANCE VECTOR ROUTING ON DATAGRAM POINT-TO-POINT LINKS

BACKGROUND OF THE INVENTION

This invention relates generally to a protocol used in interconnected computer networks known as distance vector routing and, more specifically, to distance vector routing for use in interconnected networks having point-to-point links for transmission of messages in a "datagram" environment. Before these terms can be meaningfully discussed, some background concerning communication over computer networks is needed.

To make computer networking more manageable, network functions are commonly partitioned using a layering concept. Application-to-application data transfer between two interconnected computers or "nodes" in a network is accomplished by logically building functions in a series of layers, where each layer uses the services of the layer immediately below, adds functions of its own, and presents a richer service to the layer immediately above. Each layer in a node that is the source of a message or information packet logically communicates with its peer layer in a destination node, but does so by using the services of the layer immediately below.

The present invention concerns only the bottom three layers, commonly known as:

1. The physical layer, which includes mechanical, electrical, optical, functional and procedural properties for bit stream transmission across physical connections between data link entities.
2. The data link layer, which provides multiplexing, framing of the physical layer bit stream into messages, error detection, physical channel management and possibly other functions.
3. The network layer, which deals with creating paths through the network, involving many series of data link layer "hops."

There are two types of services that a layer can provide:

(i) "Reliable"—In this type of service, delivery of data in the order sent is guaranteed. The layer numbers messages, receives acknowledgments from destination nodes, and retransmits messages that have been lost or damaged.

(ii) "Datagram"—In this type of service, data transfer is not guaranteed to be reliable. The layer transmits data, and does not receive confirmation from the recipients that the data have been correctly received.

Originally, data link layer protocols were designed for point-to-point links, i.e. direct connections between pairs of nodes. The data link layer protocols designed for point-to-point links provided reliable service. Then Local Area Networks (LANs) were developed, enabling many nodes to be connected to a single "wire" or physical transmission medium. The development of LAN technology made datagram service the more natural choice of service. Recently, datagram data link protocols for point-to-point links have become popular. An example of a datagram point-to-point protocol is PPP.

Certain protocols, among them being distance vector routing, require that the latest piece of data get delivered correctly, but do not require that every piece of data get delivered. In other words, if new data supersede old data, it is not necessary, under these protocols, for the old data to be delivered. For such protocols, a reliable service is not the most efficient choice, because it will persist in transmitting old data even if new data is available for transmission. Transmission of old data in this situation is not only an unnecessary use of available bandwidth, but also slows down delivery of the new data, because the new data will not be delivered by a reliable service until all the previous old data have been successfully transmitted. On the other hand, conventional datagram service is not a good choice either, because the latest data must be delivered in a timely and efficient manner (unless superseded by later data).

An example of such a protocol, requiring that the latest data be delivered but not necessarily any older data, is a particular type of Network Layer protocol known as distance vector routing. It is used by DEC-NET Phase IV, as well as other Network Layer protocols, such as RIP. In this protocol, each router node X is responsible for informing each of X's neighbors about X's distance to each destination in the network. X calculates its own distance to each destination based on its neighbor's reported distances to that destination. Thus X's distance to a particular destination must be reliably delivered to each neighbor, unless X's recomputation of its distances results in a different distance to that destination before the previous value is successfully transmitted. In this case the previous value need not be transmitted, and instead the new value must be transmitted.

As outlined above, a significant problem with a conventional distance vector routing protocol is that, if the data link layer provides datagram service to the network layer, the protocol has no way of ensuring that updated distance vectors will reach their destinations. One solution that has been proposed is to have each router retransmit its distance vector to neighboring routers on a periodic basis, whether or not any changes have occurred in the distance vector. The theory underlying this approach is that if any updated distance vector does not reach its destination, the likelihood is that the next periodic transmission will be made without error. This approach is used in a datagram data link layer protocol known a PPP (for point-to-point protocol). Its principal disadvantage is that it incurs unnecessary overhead. Distance vectors are updated whether or not they have changed, which results in significant unnecessary message traffic between routers. The approach has also been applied to local area networks, as distinguished from point-to-point links, since it was once perceived that the bandwidth of LANs was abundant.

An alternative approach is to provide reliable service for this type of router traffic only, but this also poses some significant difficulties. If reliable service is not needed for normal data message traffic, there has to be some way of distinguishing the distance vector traffic from normal data packets. Moreover, with reliable service, each time an information packet with updated distance vector data was transmitted, the transmitting router would be forced to retain the packet until an acknowledgment was received. Having to retain multiple packets until acknowledgments are received is an inefficient use of data storage facilities. An additional drawback is that, if the distance vector changes before an acknowledgment is received, a new update could not be immediately transmitted by the router, which must wait until the prior update is acknowledged.

It will be appreciated from the foregoing that there is still a need for improvement in the way that distance vectors are transmitted between routers in a network. Specifically, what is needed is some way of making sure that all routers connected by point-to-point datagram links will receive updates to distance vectors in a timely and efficient manner, but without the unnecessary burden of mandatory periodic transmission of data, and without the drawbacks associated with adding reliable service. The present invention is directed to this end.

SUMMARY OF THE INVENTION

The present invention resides in a method, and corresponding apparatus, for providing current distance vectors for use in multiple routers in an interconnected computer system. Updates to the distance vectors are transmitted only when a change has occurred in the distance vector data, and the routers may be connected by point-to-point links that provide datagram service. Briefly, and in simple terms, the method of the invention comprises the steps of detecting changes in a distance vector stored in a router; then, upon the detection of a distance change for a destination d in the distance vector, setting a Send Flag corresponding to that destination d and corresponding to every neighboring router to provide distance vector update items; detecting the availability of a link to a selected neighboring router n; and transmitting an information packet to the neighboring router n over the available link, the information packet containing as many as possible of the distance vector update items that are flagged by Send Flags associated with router n. The method also includes the steps of selecting a unique sequence number for transmission with the packet; storing the sequence number in a sequence number field SN(d,n) for each distance vector update item transmitted with the packet; receiving an acknowledgment message from the neighboring router n, containing the same unique sequence number that was transmitted with the information packet; and clearing the sequence number field in every location of the distance vector in which the unique sequence number is stored, to indicate successful transmission of the corresponding distance vector update item.

More specifically, the method further includes the steps of scanning for the availability of links to other neighboring routers; and repeating, for each available link, the steps of transmitting an information packet, selecting a unique sequence number, storing the sequence number in the distance vector, receiving an acknowledgment message, and clearing the appropriate sequence number fields in the distance vector. In accordance with the method of the invention, distance vector updates are transmitted to all of the neighboring routers as the links to those routers become available.

In the illustrative embodiment of the invention, the step of transmitting the information packet includes scanning the distance vector for update items that have not yet been transmitted, storing each located update item in the information packet and, when the packet is full, initiating its transmission. The step of transmitting the information packet may also include the additional steps of checking to determine whether a selected number of destination items in the distance vector have been scanned and, if so, initiating transmission of the packet even if it is not full. In the described embodiment, the step of scanning the distance vector is performed on a round-robin basis, such that scanning begins, for a particular neighboring router, at a destination item following the one last scanned prior to initiating transmission of the last information packet to the same neighboring router.

The method further includes the steps of receiving a distance vector update packet from a neighboring router, updating a distance vector at the receiving router in accordance with the information received in the distance vector update packet, and transmitting an acknowledgment message to the router from which the distance vector update packet was received. The acknowledgment message includes the same unique sequence number that was contained in the received distance vector update packet.

Another aspect of the invention is that distance vector update items are automatically retransmitted if an acknowledgment is not received within a selected time period. This feature involves the steps of periodically saving the sequence number of the last information packet transmitted by the router; periodically retrieving the sequence number of the last information packet transmitted at a selected time period earlier; and scanning the distance vector for the sequence numbers equal to or less than the retrieved sequence number. These numbers indicate distance vector update items that have been transmitted but not acknowledged during the selected time period. Subsequent steps include clearing any sequence numbers located in the preceding scanning step; and setting the Send Flags corresponding to the sequence numbers that have been cleared in the preceding step. As a result of setting the Send Flags and clearing the sequence numbers of these distance vector update items, they will be retransmitted.

The corresponding apparatus of the invention includes, in general terms, means for detecting changes in a distance vector stored in a router; means responsive to the detection of a distance change for a destination d in the distance vector, for setting a Send Flag corresponding to that destination d and corresponding to every neighboring router to provide distance vector update items; means for detecting the n; and means for transmitting an information packet to the neighboring router n over the available link, the information packet containing as many as possible of the distance vector update items that are flagged by Send Flags associated with router n. In addition, the apparatus includes means for selecting a unique sequence number for transmission with the packet; means for storing the sequence number in a sequence number field SN(d,n) for each distance vector update item transmitted with the packet; means for receiving an acknowledgment message from the neighboring router n, containing the same unique sequence number that was transmitted with the information packet; and means for clearing the sequence number field in every location of the distance vector in which the unique sequence number is stored, to indicate successful transmission of the corresponding distance vector update item.

It will be appreciated from the foregoing that the present invention represents a significant advance in the field of computer networks. In particular, the invention provides a simple but reliable solution to the problems involved in updating distance vectors in routers connected by point-to-point datagram links. The invention avoids the complexities and drawbacks of reliable service, but still ensures that distance vector update items are reliably distributed to neighboring routers. Other aspects and advantages of the invention will become apparent from the following more detailed description, taken in conjunction with the accompanying drawings.

BRIEF DESCRIPTION OF THE DRAWINGS

FIG. 2a is a diagram showing the format of a distance vector modified in accordance with the present invention;

FIG. 2b is a diagram showing the format of a typical distance vector update message for transmission from one router to a neighboring router;

FIG. 2c is a diagram showing the format of an acknowledgment message transmitted from a router upon receipt of a distance vector update of the kind shown in FIG. 2b;

DESCRIPTION OF THE PREFERRED EMBODIMENT

Figure 1:
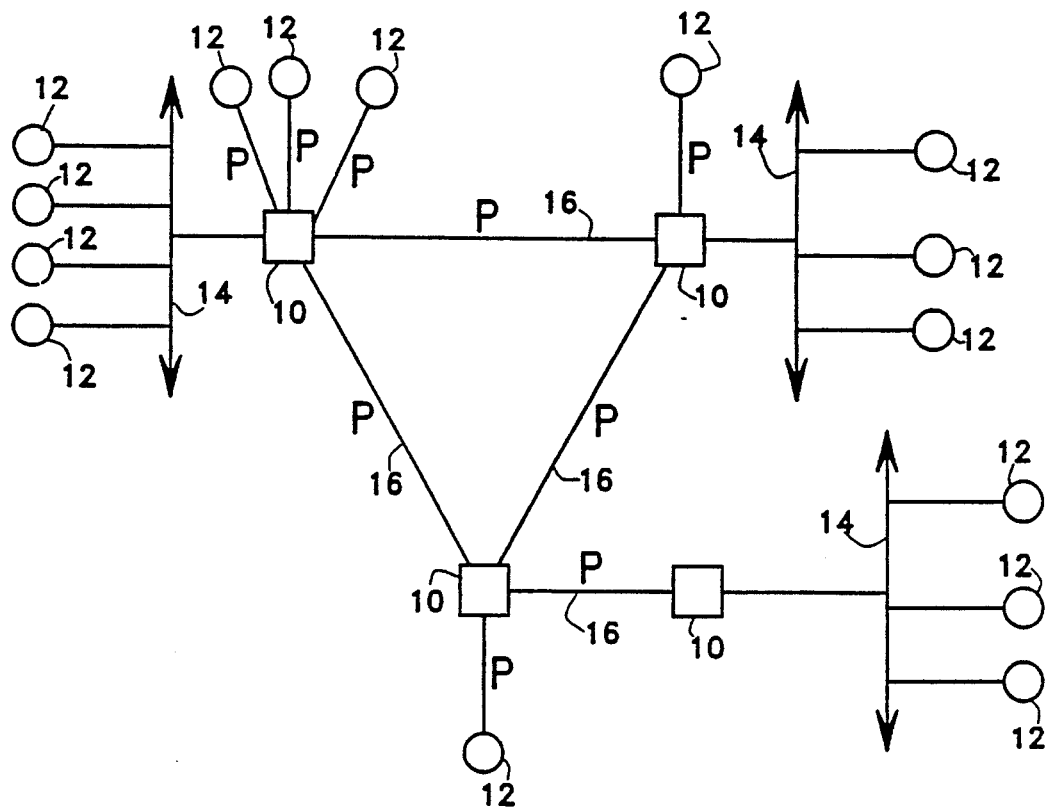
FIG. 1 is a diagrammatic view of a typical network topology, including a number of routers, to which distance vector routing information is to be distributed in accordance with the present invention.

As shown in the drawings for purposes of illustration, the present invention is concerned with improvements in the field of distance vector routing in networks of interconnected computers. FIG. 1 shows a typical network configuration, including a number of routers or routing destinations, shown as small squares and indicated by reference numeral 10, and a number of non-routing destinations 12, shown as small circles. Local area networks (LANs) 14 are each shown as a line with an arrowhead at each end. Datagram point-to-point links are designated by the letter P. It will be seen that the routers 10 in the illustrative topology are interconnected by datagram point-to-point links. The method to be described operates in this topology over each of the four links 16 that interconnect the routers 10.

In a commonly used distance vector routing algorithm, each router is responsible for maintaining its own distance vector, which is basically a table of the shortest "distances" from the router to each known destination. The vector is generated from a knowledge of the distances to each neighbor destination, and from copies of distance vectors received from each of the neighboring routers. On start-up, a router has knowledge only of the distances to the neighboring routers and to non-routing destinations connected to this router. A neighboring router is one that may be reached directly, i.e. without passing through another router or node. Each router initially assumes that the distances to other destinations are infinite. On receipt of distance vectors from the neighboring routers, a router computes the shortest distance to each destination, updates its own distance vector accordingly, and transmits the updated vector to its neighboring routers. Each of the routers follows the same procedure, and by an iterative process the distance vectors develop correct and consistent data in all of the routers. This procedure is already well known in the computer network field.

Once the distance vectors have stabilized, which typically happens in a relatively short period of time, the routers perform their intended functions of routing information packets using the shortest or most efficient links for each "hop" of their journey from source to destination. However, it is still necessary to provide some mechanism for updating distance vectors in the event that distances or network topologies change. Ideally, only when a router becomes aware that its distance vector has changed should it be necessary to transmit a copy of the updated distance vector to the neighboring routers. When reliable service is provided to the router, each update transmitted will be acknowledged by its recipient. Often, the service provided to a router by the data link layer protocol is of the datagram type, under which there is no assurance that an information packet ever reaches its destination. This problem is further aggravated by the large number of destinations now to be found in a typical network topology. The number is usually so large that a distance vector cannot be transmitted in one information packet. Since distance vectors have become so large, they are now typically transmitted piecemeal, i.e. if a destination distance changes, only the data relating to the new distance and its related destination will be transmitted to the neighboring routers.

One way of handling the transmission of this update information is to provide a set of Send Flags (SF) for each destination, the set having one flag for each neighboring router. Thus each destination, d, in the distance vector includes a set of Send Flags, SF(d,1) through SF(d,N), where there are N neighboring routers. When a distance vector update is to be sent to the neighboring routers, the Send Flags for that destination are all set to a selected state, such as "1" for all neighboring routers. When links to the various neighbors become free, the distance vector update is transmitted and the corresponding Send Flag is cleared. The Send Flags ensure that the update is transmitted to each neighboring router as soon as possible, but do not ensure that the updates are received. As discussed above, one proposal to ensure receipt of distance vector updates in a datagram environment it to transmit the entire distance vector periodically, whether or not changes have occurred. For this approach, all of the Send Flags would be set periodically to initiate the transmissions.

In accordance with the present invention, a simple mechanism is provided to ensure that distance vector updates that are transmitted only as needed are received by the neighboring routers, even though no reliable service is provided by the data link layer protocol. The invention requires the use of a sequence number associated with each information packet that carries distance vector updates. This sequence number, which uniquely identifies the information packets that carry distance vector updates, is also stored in the distance vector of the originating router. When a packet containing one or more distance vector updates is received by a router, an acknowledgment containing the same sequence number is transmitted back to the originating router, which then modifies its distance vector to indicate that the distance vector updates that were sent in a packet with that sequence number have been successfully received.

FIG. 2a shows a distance vector in diagrammatic form, as stored in a router. The distance vector may be thought of as a table having a row for each known destination, the number of which appears in the first column, and having columns in which data relating to the various destinations are stored. One column contains the shortest distance to the destination and another contains the identity of the neighbor through which the destination is reached. Then there are N additional columns, for the total number of neighboring routers.

The entries in these columns provide a total of D*N items, where D is the total number of destinations. Each entry (d,n) has two fields: a Send Flag SF(d,n), and a Sequence Number SN(d,n). The Send Flag needs only one bit of data. The length of the sequence number field is a matter of design choice and depends on the potential size of the network configuration. A sequence number field of two bytes (16 bits) is probably adequate for most needs.

Figure 3:
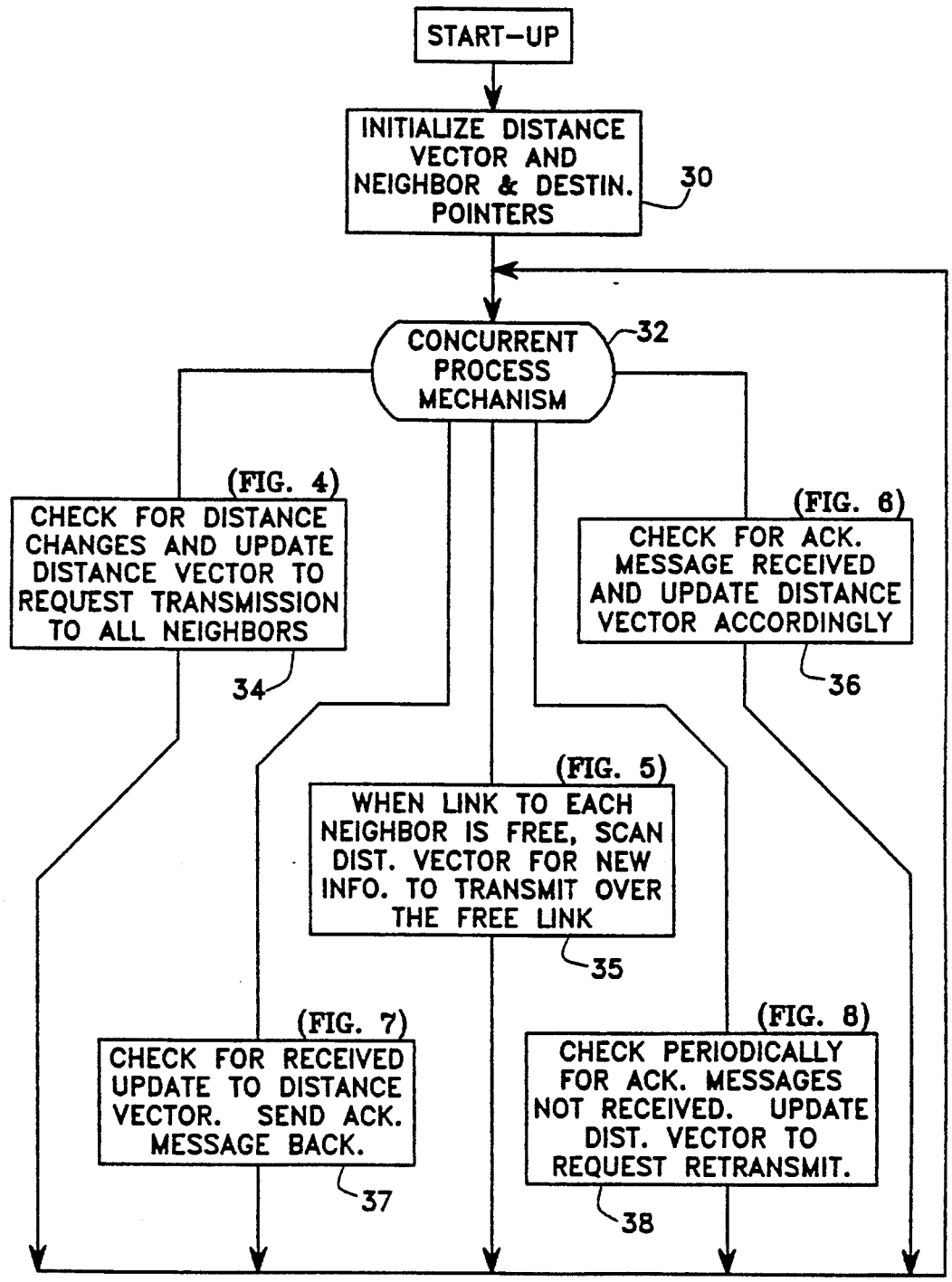
FIG. 3 is a flowchart showing the broad functions performed in accordance with the method of the invention.

FIG. 3 shows the principal functions performed in accordance with the method and apparatus of the invention. When a router is first placed in operation, there are a number of initialization functions to be performed, as indicated in block 30. The distance vector of FIG. 2a is initialized to reflect that the distances to most destinations are not yet known, and to reflect the known distances to neighbors. Also, various table pointers have to be initialized before starting operation. As indicated in block 32, the method of the invention involves the concurrent performance of a number of different functions, which are briefly described in blocks 34–38, and shown in more detail in FIGS. 4–8. How this concurrency of operations is achieved is not a significant aspect of the invention, and any conventional approach may be used. For example, the several functions described may be performed on a single computer processor, which shares its processing resources among the functions on a time-sliced basis. Alternatively, separate processors operating in parallel may be used to implement the several functions.

In any event, the five functions will be separately described but it will be understood that they are performed concurrently. Further, pointers d and n used in a function to point to information relating to specific destinations and neighboring routers, are maintained separately and independently of similar pointers used in other functions. For example, the destination pointer, d, is used in each of four of the functions. Although the same symbol d is used for convenience in all cases, separate pointers have to be maintained for the separate functional entities described, and these separate pointers will in general have different values of d at any instant in time. Therefore, the concurrent process mechanism 32 impliedly includes some means of ensuring that the destination and neighbor pointers, d and n, are independently maintained for each of the five concurrently performed functions.

Briefly, the five functions are as follows:

Block 34 (expanded in FIG. 4): If changes are detected in the distance vector maintained by this router, the distance vector is conditioned to request that distance vector updates be transmitted to all of the neighboring routers.

Block 35 (expanded in FIG. 5): When a link to a neighboring router becomes free, an information packet is formed to contain as many distance vector updates as will fit in the packet. A unique sequence number is obtained for the packet, is included in the transmitted packet, and is also stored in the distance vector items corresponding to distance vector updates that were included in the packet. The presence of a sequence number in the distance vector indicates that a distance vector update has been transmitted but its receipt has not yet been acknowledged.

Block 36 (expanded in FIG. 6): When an acknowledgment message is received by a router, the distance vector is scanned for sequence numbers that are the same as the one contained in the acknowledgment message. These sequence numbers are cleared in the distance vector, to indicate that the corresponding distance vector updates have been received correctly.

Block 38 (expanded in FIG. 7): When a router receives an information packet containing one or more distance vector updates from another router, the receiving router updates its own distance vector, if necessary, based on the information received in the received packet. Then the receiving router transmits an acknowledgment message containing the same sequence number as the received information packet.

Block 38 (expanded in FIG. 8): To handle a situation in which a distance vector update is transmitted but its receipt is not acknowledged, each router periodically checks for distance vector updates for which no acknowledgments have been received within some selected time limit. Any such distance vector updates are automatically retransmitted.

Although the described method uses sequence numbers to ensure delivery of the distance vector updates to the neighboring routers, there some importance distinctions between this approach and the use of reliable service. In a reliable service approach, each message must be delivered exactly once and in the order sent. Thus, if a first distance vector update were to be sent and lost, a subsequent update for the same neighboring router could not be received and processed without violating the reliable service guarantees. In the method of the present invention, acknowledgment of the receipt of one update is not a prerequisite for receipt and processing of a subsequent update to the same neighboring router, even if the subsequent update relates to the same destination as the first update.

The five principal functions of the method will now be described in more detail, with reference to FIGS. 4–8. Each of these functions is performed in a continuous and cyclic manner, as will now be described.

Figure 4:
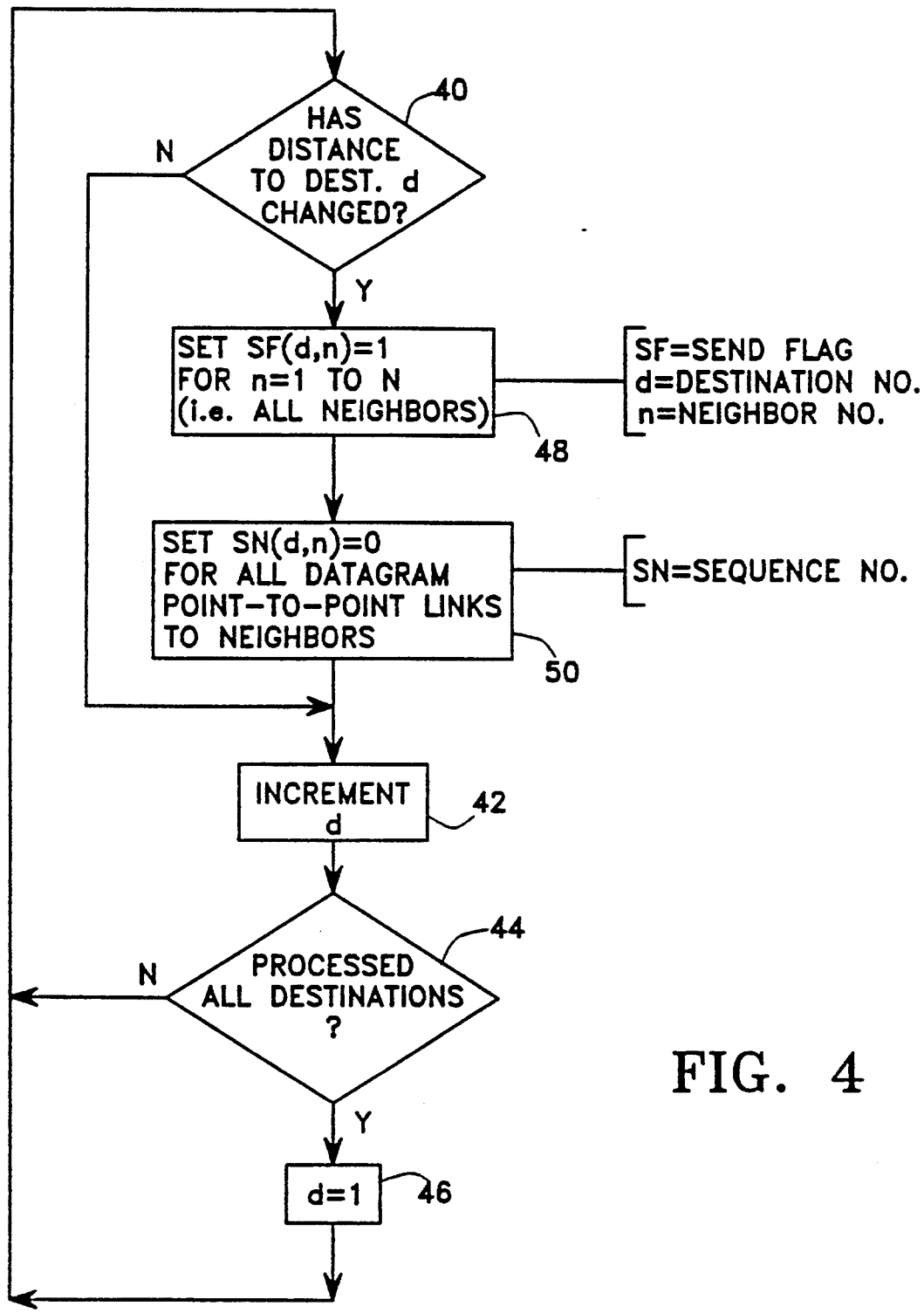
FIGS. 4-8 are flowcharts showing in more detail the functions performed in five principal blocks of FIG. 3.

Basically, the function performed in FIG. 4 is to react to changes in a router's own distance vector. A change occurs when, as a result of data received from neighboring routers, or as a result of network configuration changes that are otherwise conveyed to the router, the router makes a change in its distance vector. As indicated in block 40, the distanced to a destination defined by a pointer d is examined for changes. If there is no change, the value of the pointer d is incremented (block 42), then checked to determine if its maximum value D has been reached (block 44). If so, the pointer is reset to point to destination #1 again (block 46), and processing continues, checking each of the destinations in turn (block 40).

When a change in the distance to a destination d is detected in block 40, the distance vector is modified to request transmission of a distance vector update to each of the neighboring routers. First the Send Flags are set to a "1" state for all of the neighboring routers. That is, SF(d,n)=1 for all values of n from 1 to N, as indicated in block 48. Then the sequence number field SN(d,n) is reset to zero for all point-to-point datagram links to neighboring routers, as indicated in block 50. Normally the sequence numbers will already be zero, unless an earlier distance vector update has been transmitted but not yet acknowledged.

The presence of a nonzero sequence number in the distance vector serves as a flag indicating that a distance vector update has been transmitted but not yet acknowledged by a receiving router. A zero sequence number, together with a nonzero Send Flag, indicates to this router that a distance vector update should be transmitted. An important advantage of the present method is that, if a first update is not yet acknowledged by a receiving router, a second update may still be transmitted, simply by resetting the sequence number to zero in the distance vector position corresponding to the appropriate destination and receiving router. If an acknowledgment to the first update is subsequently received, it will be automatically ignored.

Figure 5:
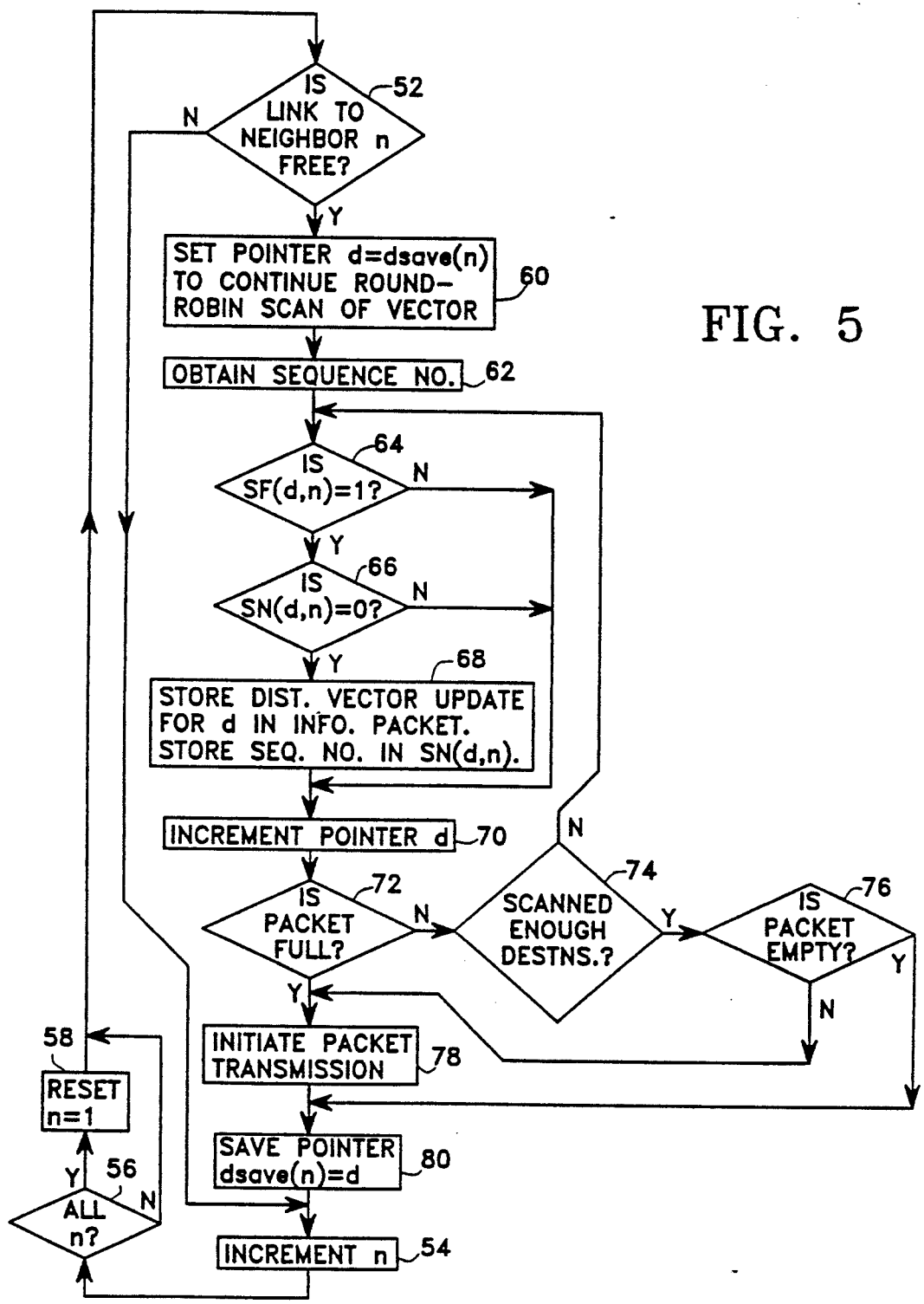

The function illustrated in FIG. 5 is to scan for availability of communications links to each of the neighboring routers in turn, and to send distance vector updates to the neighboring routers. Performing this function involves two nested loops, one of which checks for link availability for each of the neighboring routers in turn, and the other of which scans through the distance vector to locate updates for transmission.

As indicated in block 52, a check is made to determine if the link to neighbor n is free. If not, the pointer n is incremented (block 54), and checked to see whether its maximum has been reached (block 56). When the maximum n count is reached, the pointer n is reset to point to the first neighbor again (block 58), and processing continues in block 52, searching for the next neighbor link that is free.

When a free link is found, a destination pointer d is set to an initial value obtained from a previously stored location for this particular neighbor n. As indicated in block 60, there are n such stored values, designated dsave(n). Each saved destination pointer indicates a position in the distance vector following the last position from which an update was extracted for transmission to the same neighbor. Keeping these pointers ensures that the distance vector updates are transmitted on a round-robin basis from the distance vector. Because access to the links to neighbors may be limited by the presence of other traffic, some means of scanning the distance vector has to be provided, to ensure that all of the changes that occur eventually get transmitted. If the vector were scanned from the top each time, changes occurring near the bottom of the vector would take longer to be transmitted to the neighbors than changes near the top of the vector. Round-robin scanning eliminates this possibility.

Once the destination pointer is restored (block 60), a new sequence number is obtained (block 62) for use in a packet of data that will next be generated. The new sequence number is stored in an information packet buffer. If no updates are located for transmission to this neighbor n, the same sequence number will be used in the next pass, for neighbor n+1. The sequence number is obtained from a counter (not shown), which will be incremented only upon transmission of the packet. In some instances it may be desirable to use a separate counter for each neighboring router. More generally, the invention requires only that each information packet containing distance vector updates should be uniquely identifiable. A sequence number obtained from a relatively large counter meets this requirement, but other implementations are also possible. For example, the "sequence" number could instead be a random number, so long as there was some provision for eliminating duplicates occurring over a reasonably large time span.

Next, a scan of the distance vector is started for any items that have the Send Flag set, SF(d,n)=1, as determined in block 64, and have a zero sequence number SN(d,n)=0, as determined in block 66. If a change is, by this means, found in the distance vector, a distance vector update is stored in an information packet buffer, as indicated in block 68. As shown diagrammatically in FIG. 2b, the packet can hold multiple distance vector update items, and includes a single sequence number field. As an update item is placed in the packet buffer, the sequence number is also stored in the sequence number field SN(d,n) for this particular destination d and neighboring router n. At the same time the corresponding Send Flag SF(d,n) is reset to zero.

If the destination d does not have the Send Flag set or does not have the sequence number field set to zero, as determined in blocks 64 and 66, this item of the distance vector has not been updated or an update was previously sent and is not stored in the packet buffer, i.e. the function of block 68 is bypassed. Then the pointer d is incremented (block 70), and a check is made to determine whether the packet buffer is full (block 72). If the packet buffer is not yet full, the scan for changes in the distance vector will normally continue, in blocks 64 and 66. Incrementing the pointer d in block 70 is, of course, performed in a moduloD manner, i.e. the pointer is incremented until the maximum value D is reached, then automatically reset to "1" again.

Even if the packet is not full, as determined in block 72, it may be desirable to transmit it rather than loop continuously looking for changes to send to this particular neighbor. Transmission of an only partly filled packet may be initiated upon expiration of a selected time interval or, as shown here, initiated after a scan of all destinations (or some lesser number of destinations). Thus a further test of the pointer d (block 74) is made if the packet buffer is not full. This test (block 74) determines whether the pointer has been advanced through one complete cycle, back to its original value obtained from dsave(n). Alternatively, block 74 may simply keep track of how many destinations have been scanned since starting processing for this particular neighboring router n. In any event, if some selected number of destinations has not yet been scanned, processing will continue at block 64, and scanning continues for additional distance vector updates to transmit in the packet being assembled for transmission. If the selected number of destinations has been scanned, as determined in block 74, and if at least one update has been stored in the packet buffer, as determined in block 76, transmission of the packet is initiated, in block 78. Then the destination pointer is saved as dsave(n), as indicated in block 80, and processing continues by incrementing the neighbor pointer n (blocks 54, 56, 58), and returning to block 52 to find another free link to a neighboring router.

In brief, the method steps described with reference to FIG. 5 initiate the transmission of distance vector update items, packing as many as will fit into each information packet transmitted a neighboring router. Once an update has been placed in the packet buffer for transmission, the appropriate Send Flag SF(d,n) is reset to zero and the sequence number of the packet in which the update was transmitted is stored in the sequence number field SN(d,n) of the distance vector, to indicate that an acknowledgment is being awaited.

Figure 6:
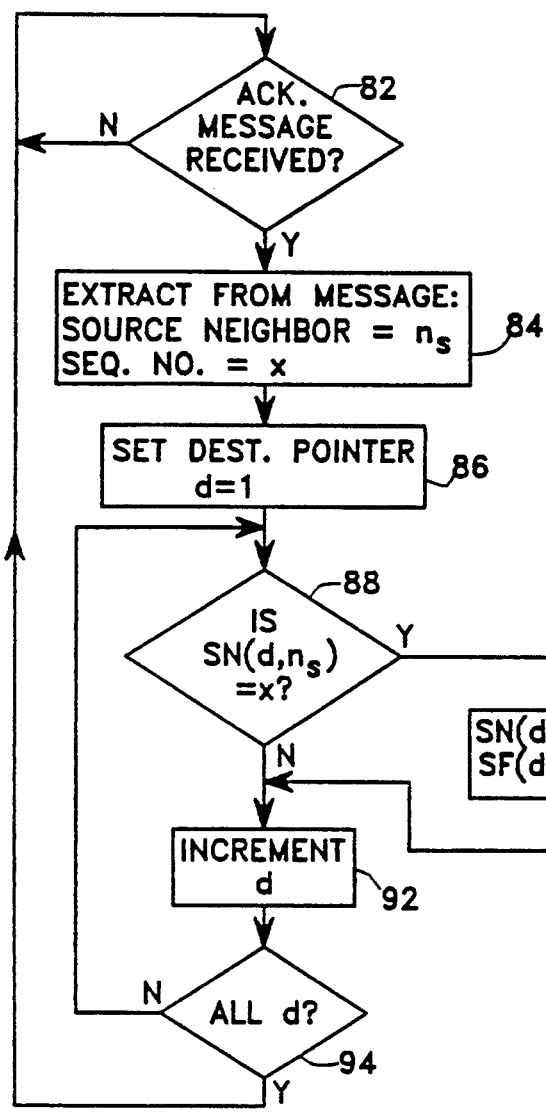

The function of the steps illustrated in FIG. 6 is to process received acknowledgment messages. An update acknowledgment message contains the information shown in FIG. 2c, and includes a code indicating the type of message, and a sequence number identical to the sequence number of the information packet of which the receipt is being acknowledged. Inherent in the acknowledgment message is its source, since the identity of the router that originates the acknowledgment will be contained in a message header.

In this aspect of the present method, a continual check is made for the receipt of an acknowledgment message, as indicated in block 82. No action is taken in this aspect of the method until an acknowledgment message is received. Then the source neighbor identification, $n_s$, and the sequence number, x, are extracted from the received message, as indicated in block 84. A destination pointer d is initialized (block 86), and each sequence number in the distance vector is examined (block 88) to locate any equal to x. Basically, the question posed in block 88 is whether $SN(d,n_s)=x$, for any value or values of d. If any distance vector items are found to have the sequence number x, these are modified by clearing the sequence number to zero, and by making sure that the Send Flag is also zero, as indicated in block 90. The destination pointer is incremented (block 92), and checked for its maximum value in block 94. Until the maximum value is reached, scanning continues in block 88 until all the destinations in the distance vector have been checked. Then return is made to block 82 to wait for another acknowledgment message.

Figure 7:
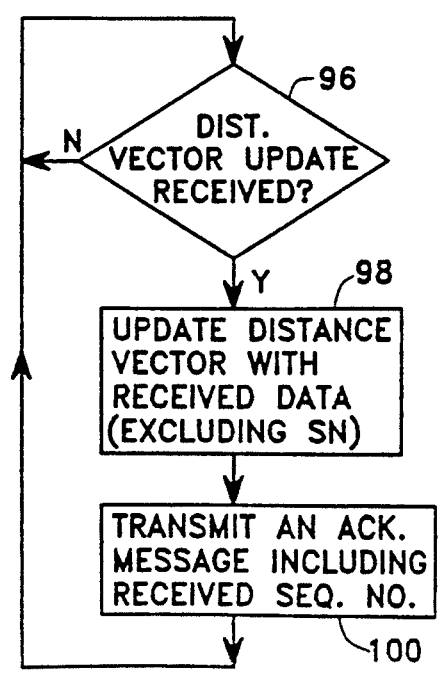

The function of the steps illustrated in FIG. 7 is to process received distance vector update messages. When one is received, as detected in block 96, the receiving router's distance vector is appropriately updated, as indicated in block 98. That is to say, the receiving router's shortest distances to the destinations with which the received update was concerned are recomputed. Then an acknowledgment message is generated, as indicated in block 100, including the same sequence number that was contained in the received update message packet.

Figure 8:
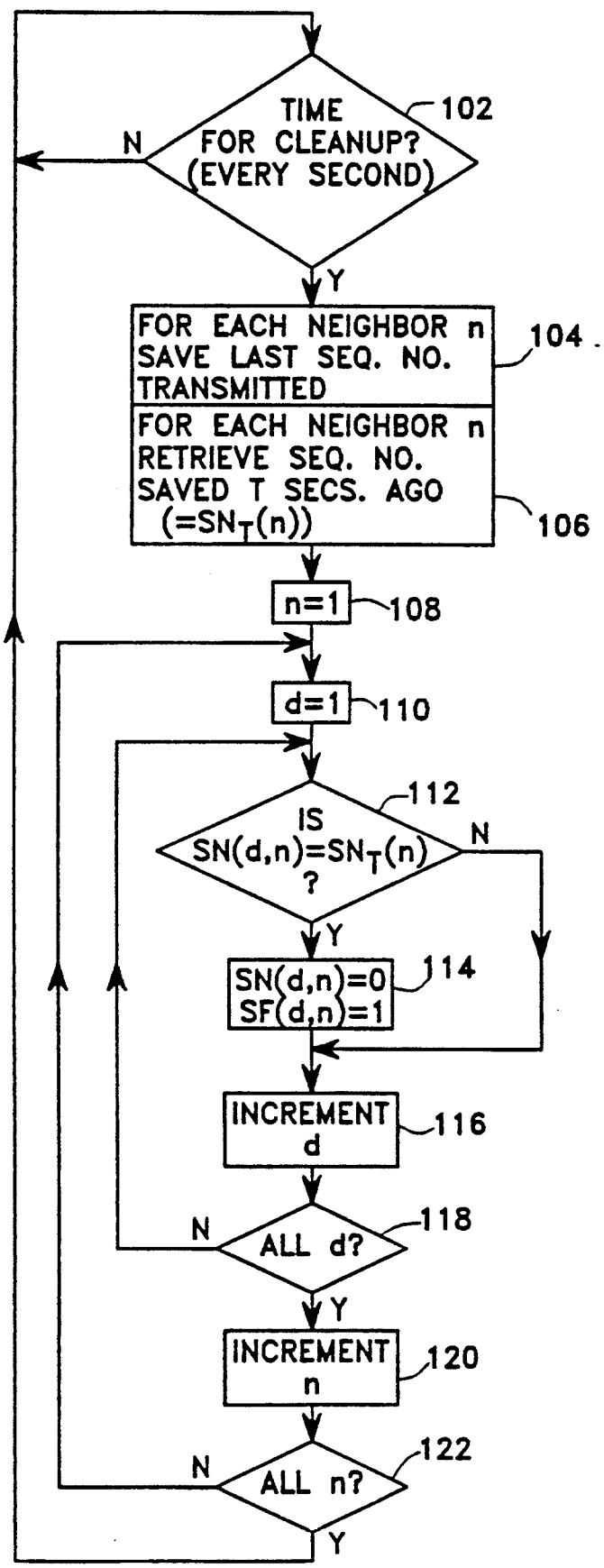

FIG. 8 illustrates the functions performed to handle situations in which no acknowledgment is received after transmitting an information packet that contains distance vector update items. Basically, this aspect of the method triggers retransmission of distance vector update items if no acknowledgment is received within a selected time period, such as T seconds. In this illustrative flowchart, a "cleanup" operation is performed every second, although it will be understood that any periodic time may be used.

At the end of every one-second period, as detected in block 102, the last sequence number transmitted is saved (block 104). Then the sequence number transmitted T seconds earlier is retrieved (block 106). Performing these operations requires a cyclically accessed sequence of T storage locations. A scan is then performed of the entire matrix of sequence numbers $SN(d,n)$ stored in the distance vector. Pointers n and d are initialized, in blocks 108, 110; then each sequence number $SN(d,n)$ is compared (in block 112) with the retrieved sequence number from T seconds earlier, designated $SN_T$. If $SN(d,n)$ is less than or equal to $SN_T$, then it may be concluded that this item of the distance vector was transmitted to router n more than T seconds ago and that no acknowledgment has been received. A request is made to retransmit the item by setting the Send Flag $SF(d,n)=1$ and clearing the sequence number field $SN(d,c)=0$, as indicated in block 114. The destination pointer d is incremented (block 116) until all destinations have been scanned (block 118). Then the neighbor pointer n is incremented (block 120) until all the neighbors have been scanned (block 122), which concludes processing until the next one-second period has elapsed, as determined in block 102.

If, as described earlier, the sequence numbers are obtained from a large counter, they will recur in a cyclic fashion. Therefore, a definition is required for ordering of the numbers in a circular sequence number space. Given a space of sequence numbers ranging from 0 to $2N-1$, a sequence number i is defined to be "greater than" a sequence number j if, and only if, one of the following arithmetic inequalities is true:

either $N>(i-j)>0$ or $(j-i)>N$.

It will be appreciated from the foregoing that the present invention represents a significant advance in the field of interconnected networks of computers. In particular, the invention provides a simple and efficient technique for transmitting updated distance vector information among routers that are connected by datagram point-to-point links. The manner in which an information packet sequence number is used provides for positive acknowledgment of update messages, but does not require that an update be acknowledged before a subsequent update is delivered. Therefore, rapidly occurring changes can be more quickly delivered to other routers, without waiting for acknowledgment of each previous update message. The invention also provides for retransmission of update messages in the event that acknowledgments are not received within a selected time period. An important advantage of the invention is that these features are implemented with only modest demands on storage facilities. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A method for updating distance vectors in a network topology that includes multiple destinations and multiple routers, some of which are connected by datagram point-to-point links, the method comprising the steps of:

detecting changes in a distance vector stored in a router;

upon the detection of a distance change for a destination d in the distance vector, setting a Send Flag corresponding to that destination d and corresponding to every neighboring router to provide distance vector update items;

detecting the availability of a link to a selected neighboring router n;

transmitting an information packet to the neighboring router n over the available link, the information packet containing as many as possible of the distance vector update items that are flagged by Send Flags associated with router n;

prior to transmitting the packet, selecting a unique sequence number for transmission with the packet;

storing the sequence number in a sequence number field $SN(d,n)$ for each distance vector update item transmitted with the packet;

receiving an acknowledgment message from the neighboring router n, containing the same unique sequence number that was transmitted with the information packet; and clearing the sequence number field in every location of the distance vector in which the unique sequence number is stored, to indicate successful transmission of the corresponding distance vector update item.

2. A method as defined in claim and further comprising the steps of:

scanning for the availability of links to other neighboring routers; and repeating, for each available link, the steps of transmitting an information packet, selecting a unique sequence number, storing the sequence number in the distance vector, receiving an acknowledgment message, and clearing the appropriate sequence number fields in the distance vector, whereby distance vector updates are transmitted to all of the neighboring routers.

3. A method as defined in claim 2, wherein the step of transmitting the information packet includes:

scanning the distance vector for update items that have not yet been transmitted;

storing each located update item in the information packet; and when the packet is full, initiating its transmission.

4. A method as defined in claim 3, wherein the step of transmitting the information packet includes the additional step of:

checking to determine whether a selected number of destination items in the distance vector have been scanned; and if so, initiating transmission of the packet even if it is not full.

5. A method as defined in claim 3, wherein:

the step of scanning the distance vector is performed on a round-robin basis, wherein scanning begins, for a particular neighboring router, at a destination item following the one last scanned prior to initiating transmission of the last information packet to the same neighboring router.

6. A method as defined in claim 2, and further comprising the steps of:

receiving at a neighboring router a distance vector update packet;

updating a distance vector at the receiving router in accordance with the information received in the distance vector update packet; and transmitting an acknowledgment message to the router from which distance vector the update packet was received, wherein the acknowledgment message includes the same unique sequence number that was contained in the received distance vector update packet.

7. A method as defined in claim 2, and further comprising the steps of:

periodically saving the sequence number of the last information packet transmitted by the router;

periodically retrieving the sequence number of the last information packet transmitted a selected time period earlier;

scanning the distance vector for the sequence numbers equal to or less than the retrieved sequence number, whereby these numbers indicate distance vector update items that have been transmitted but not acknowledged for more than the selected time period;

clearing any located sequence numbers located in the preceding step; and setting the Send Flags corresponding to the sequence numbers cleared in the preceding step, whereby the distance vector update items corresponding to the unacknowledged transmissions are flagged for retransmission.

8. Apparatus for updating distance vectors in a network topology that includes multiple destinations and multiple routers, some of which are connected by datagram point-to-point links, the apparatus comprising:

means for detecting changes in a distance vector stored in a router;

means responsive to the detection of a distance change for a destination d in the distance vector, for setting a Send Flag corresponding to that destination d and corresponding to every neighboring router to provide distance vector update items;

means for detecting the availability of a link to a selected neighboring router n;

means for transmitting an information packet to the neighboring router n over the available link, the information packet containing as many as possible of the distance vector update items that are flagged by Send Flags associated with router n;

means operable prior to transmitting the packet, for selecting a unique sequence number for transmission with the packet;

means for storing the sequence number in a sequence number field $SN(d,n)$ for each distance vector update item transmitted with the packet;

means for receiving an acknowledgment message from the neighboring router n, containing the same unique sequence number that was transmitted with the information packet; and means for clearing the sequence number field in every location of the distance vector in which the unique sequence number is stored, to indicate successful transmission of the corresponding distance vector update item.

9. Apparatus as defined in claim 8, wherein:

the apparatus further comprises means for scanning for the availability of links to other neighboring routers; and the means for transmitting an information packet, selecting a unique sequence number, storing the sequence number in the distance vector, receiving an acknowledgment message, and clearing the appropriate sequence number fields in the distance vector, are all operable to transmit distance vector updates to the other neighboring routers.

10. Apparatus as defined in claim 9, wherein the means for transmitting the information packet includes:

means for scanning the distance vector for update items that have not yet been transmitted;

means for storing each located update item in the information packet; and means activated when the packet is full, for initiating its transmission.

11. Apparatus as defined in claim 10, wherein the means for transmitting the information packet includes:

means for checking to determine whether a selected number of destination items in the distance vector have been scanned; and means responsive to the last-recited means, for initiating transmission of the packet even if it is not full.

12. Apparatus as defined in claim 10, wherein:

the means for scanning the distance vector operates on a round-robin basis, wherein scanning begins, for a particular neighboring router, at a destination item following the one last scanned prior to initiating transmission of the last information packet to the same neighboring router.

13. Apparatus as defined in claim 9, and further comprising:

means for receiving at a neighboring router a distance vector update packet;

means for updating a distance vector at the receiving router in accordance with the information received in the distance vector update packet; and means for transmitting, an acknowledgment message to the router from which the distance vector update packet was received, wherein the acknowledgment message includes the same unique sequence number that was contained in the received distance vector update packet.

14. Apparatus as defined in claim 9, and further comprising the steps of:

means for periodically saving the sequence number of the last information packet transmitted by the router;

means for periodically retrieving the sequence number of the last information packet transmitted a selected time period earlier;

means for scanning the distance vector for the sequence numbers equal to or less than the retrieved sequence number, whereby these numbers indicate distance vector update items that have been transmitted but not acknowledged for more than the selected time period;

means for clearing any located sequence numbers located in the preceding step; and means for setting the Send Flags corresponding to the sequence numbers cleared by the last-recited step, whereby the distance vector update items corresponding to the unacknowledged transmissions are flagged for retransmission.

* * * * *